US012014607B2

(12) United States Patent
Blinov et al.

(10) Patent No.: US 12,014,607 B2
(45) **Date of Patent: *Jun. 18, 2024**

(54) RANDOM OUTPUT GENERATING SYSTEM

(71) Applicant: Evolution Malta Limited, Sliema (MT)

(72) Inventors: Aleksejs Blinov, Riga (LV); Aleksejs Mescerjakovs, Riga (LV)

(73) Assignee: Evolution Malta Limited, Sliema (MT)

( * ) Notice: Subject to any disclaimer, the term of this patent is extended or adjusted under 35 U.S.C. 154(b) by 0 days.

This patent is subject to a terminal disclaimer.

(21) Appl. No.: 18/134,432

(22) Filed: Apr. 13, 2023

(65) Prior Publication Data

US 2023/0252860 A1 Aug. 10, 2023

Related U.S. Application Data

(63) Continuation of application No. 17/165,505, filed on Feb. 2, 2021, now Pat. No. 11,798,379.

(30) Foreign Application Priority Data

Feb. 3, 2020 (EP) .................................... 20155171

(51) Int. Cl.

*G07F 17/32* (2006.01)
*A63F 7/02* (2006.01)
*A63F 7/04* (2006.01)
*H05B 47/17* (2020.01)
*G06Q 50/34* (2012.01)

(52) U.S. Cl.

CPC .......... *G07F 17/3297* (2013.01); *A63F 7/022* (2013.01); *A63F 7/048* (2013.01); *H05B 47/17* (2020.01); *G06Q 50/34* (2013.01)

(58) Field of Classification Search

CPC ..... G07F 17/3297; H05B 47/17; A63F 7/022; A63F 7/048; G06Q 50/34

USPC ...................................................... 463/16, 22

See application file for complete search history.

(56) References Cited

U.S. PATENT DOCUMENTS

| | | | |
|---|---|---|---|
| 5,016,879 | A | 5/1991 | Parker et al. |
| 5,788,230 | A | 8/1998 | Krise et al. |
| 6,666,766 | B2 | 12/2003 | Baerlocher et al. |
| 9,449,464 | B2 | 9/2016 | Nicely et al. |

(Continued)

FOREIGN PATENT DOCUMENTS

| | | | |
|---|---|---|---|
| WO | 2005094954 | A1 | 10/2005 |

OTHER PUBLICATIONS

"The Wall—Zero to One Million (Episode Highlight)", YouTube, Nov. 23, 2017, https://www.youtube.com/watch?v=pz2uqymHSvk, 3 pages.

(Continued)

*Primary Examiner* — Allen Chan
(74) *Attorney, Agent, or Firm* — Quarles & Brady LLP

(57) ABSTRACT

A dice shaker device and method for providing a randomized state of at least one die. The dice shaker device includes a dice plate, a dice plate actuator configured to apply a reciprocating force to the dice plate, a casing, a circumferential ridge surface extending around an outer perimeter of the dice plate, and a dice rolling space at least partly defined by the casing, the dice plate, and the circumferential ridge surface. The circumferential ridge surface can be arranged in parallel with an upper surface of the dice plate, and the circumferential ridge surface can have a width that is equal to or less than half a width of the at least one die that the dice shaker device is arranged to provide a randomized state of.

20 Claims, 8 Drawing Sheets

(56) References Cited

U.S. PATENT DOCUMENTS

| | | | |
|---|---|---|---|
| 2016/0129341 | A1 | 5/2016 | Sahl et al. |
| 2017/0333781 | A1 | 11/2017 | Glassman |

OTHER PUBLICATIONS

European Patent Office, Extended European Search Report, Application No. 20155171.0, dated Jul. 16, 2020, 8 pages.

RANDOM OUTPUT GENERATING SYSTEM

CROSS-REFERENCE TO RELATED APPLICATIONS

This application is a continuation of U.S. patent application Ser. No. 17/165,505 filed Feb. 2, 2021, which claims priority to European Patent Application No. EP 20155171.0 filed Feb. 3, 2020, the disclosures each of which are incorporated herein by reference in their entirety and for all purposes.

TECHNICAL FIELD

The present disclosure relates to a random output generating system comprising a display board and a motion device.

BACKGROUND

Random output generating systems (ROG) are known in the art and are able to generate numbers or symbols according to a random chance. There are several well-known examples of random output generating/random number generating systems and methods such as rolling a dice, coin flipping or shuffling of playing cards. Further, there is also computational methods for random output generation, mostly using pseudo-random output generation.

Random output generating systems (ROG) are known in the art and are able to generate numbers or symbols according to a random chance. There are several well-known examples of random output generating/random number generating systems and methods such as rolling a dice, coin flipping or shuffling of playing cards. Further, there is also computational methods for random output generation, mostly using pseudo-random output generation.

There are ROG systems in the market today that are interactive, convenient and offer user friendliness; however, there is room in the present art to explore the domain of providing ROG systems with improved user friendliness, interactivity and convenience compared to previous solutions. There is specifically a need for mechanical ROG systems that can be implemented in gaming applications and that incorporates electronic means to provide an improved user friendliness, interactivity and convenience.

SUMMARY

It is therefore an object of the present disclosure to provide a ROG system to mitigate, alleviate or eliminate one or more of the above-identified deficiencies and disadvantages.

This object is achieved by means of a ROG system as defined in the appended claims.

The present disclosure is at least partly based on the insight that by providing a ROG system comprising a display board and a motion device that are to generate a random output in an interactive and accommodating manner for a user. In accordance with the disclosure there is provided a ROG system according to claim 1.

The present disclosure provides a random output generating, ROG, system comprising a display board and a motion device. The display board comprises: a top portion having at least one release pocket, a plurality of receiving pockets forming a common row on an, opposite, bottom portion, and a plurality of obstacles arranged in a pattern in-between said top portion and said bottom portion.

The motion device is arranged such that when released from one of said at least one release pockets, it is transferred at least partly by gravitational force to one of said receiving pockets according to a random route via collisions with at least two of said plurality of obstacles. Further, the motion device is arranged to complete the random route within a predetermined time period. The motion device comprises a motion sensor for monitoring a movement of the motion device, control circuitry, and at least one illumination device. The control circuitry is configured to control the at least one illumination device based on at least one of the movement of the motion device and a position of the motion device relative to the display board.

A benefit of the ROG system is that it allows for a user to interactively follow the procedure of the motion device being is transferred from the release pocket to the receiving pocket. Thus, resulting in a user following the ROG system having an interactive and amusing experience.

The collision with the obstacles result in a randomized route for the motion device from a receiving pocket leading to its landing in one of the receiving pockets. The illumination device in the motion device allow for the motion device to illuminate while being transferred from the release pocket to the receiving pocket. A benefit of the illumination device is that it can help user to more clearly and interactively follow the route of the motion device. Further, the control circuitry is configured to control the illumination device based on the movement and/or position of the motion device relative to the display board. A benefit of this is that the control circuitry can adapt its control of the illumination device to different settings/events. For instance, the illumination device may illuminate with a gradually increased brightness the closer it is to a receiving pocket, or the illumination device may be configured to illuminate in a flashing manner in some settings when the ROG system is utilized.

The motion device may comprise a core portion in the shape of a cylindrical disc; and an annular bumper surrounding the circumference of said core portion. The core portion may comprise a top surface and a parallel bottom surface extending beyond the height of the bumper.

The bumper may act as a protecting enclosure of the core portion. The top surface and the parallel bottom surface extending beyond the height of the bumper may be adapted as such to allow for the top surface or the bottom surface to glide along the display board, the bumper acting as a protecting enclosure in the motion devices' collisions.

The annular bumper may comprise a resilient material, and wherein the top surface and the bottom surface of the motion device have a friction coefficient below a threshold value. The annular bumper may comprise rubber or silicon.

A benefit of having an annular bumper comprising resilient material is that the motion device can land in a receiving pocket and collide with obstacles on its way without damaging the core. Thus, the resilient material can act as a shock absorber.

The control circuitry may be configured to activate the at least one illumination device such that the illumination device is active while said motion device is transferred at least partly by gravitational force towards one of said receiving pockets subsequently to being released from one of the at least one release pockets based on a signal indicative of the movement of the motion device obtained from the motion sensor.

A benefit of this is that a user clearly can follow then the motion device is in its random route from a release pocket to a receiving pocket.

The control circuitry may further be configured to set the motion device in a power conserving mode when the motion device is stationary based on a signal indicative of the movement of the motion device obtained from the motion sensor, wherein the power conserving mode comprises deactivating the illumination device.

An advantage of having a motion device that comprises a power conserving mode is that it allows the motion device to repeatedly be used for a longer time. Thus, the power conserving mode allows an extended battery life of the motion device.

The motion device may further comprise a position sensor and/or the display board may comprise the position sensor. The control circuitry may further be configured to set said motion device in a power conserving mode when said motion device is at a predetermined distance from the display board or when said motion device is located in a receiving pocket based on a signal indicative of a position of the motion device relative to the display board obtained from the position sensor, wherein the power conserving mode comprises deactivating the illumination device. If the display board comprises a position sensor it is adapted to determine the position of the motion device relative to the display board.

A benefit of this is that it provides further means for the motion device to efficiently reduce energy consumption.

The power conserving mode may further comprise deactivating the motion sensor.

The plurality of obstacles may be arranged in a quincunx pattern. This pattern allows the motion device to travel from the release pocket to the receiving pocket by colliding with a plurality of the obstacles which increases the experience for a user overviewing the procedure.

The predetermined time period may be in the range of 5-15 seconds. By providing a predetermined time period, the user will be aware of how long the procedure is from drop to landing of the motion device. Further, the defined predetermined time period of 5-15 seconds allow for a rapid procedure for the motion device from dropping to landing but not too rapid so to hamper the user experience. Further, this time period is beneficial if the ROG system is incorporated in a gaming setting including wagers—allowing the provider of the ROG system to track/predict the number of games that can be started given a certain amount of hours. Where one game may correspond to a procedure of the motion device to be dropped from a release pocket to land in a receiving pocket.

Further, the annular bumper may comprise a shore hardness, and a size adapted to the spacing of the obstacles to provide the predetermined period.

The display board may comprise an equal number of release pockets and receiving pockets.

The ROG system may further comprise at least one camera device arranged to monitor a front surface of the display board and to output data comprising a video stream of the display board, wherein the display board comprises the front surface and a back surface, wherein the plurality of obstacles, the at least one release pocket, and the plurality of receiving pockets are arranged between the front surface and the back surface; wherein the front surface is transparent such that the motion device is visible in the video stream along its random route from the release pocket to the receiving pocket. The front surface may be a transparent glass or any other suitable surface.

A benefit of this is that it allows for a user to actively follow the motion device in its whole route from a release pocket to a receiving pocket, resulting in a better experience for a user and more trust towards the ROG system.

The back surface may comprise a display. The display may be an electronic display such as a LED display. In other words, the display board may comprise a display forming the back surface. Further, the display board may comprise: a plurality of release pockets; and a control device comprising a control unit configured to: provide a graphical representation on the display, the graphical representation comprising at least one graphical element; randomly select one of the plurality of release pockets based on an output of a random number generating algorithm; and update the graphical representation of the display so to emphasize the randomly selected release pocket prior to the motion device being dropped from the randomly selected release pocket. A control unit may be any kind of control circuitry.

A benefit of this is that it indicates for a user from which release pocket the motion device is to be dropped from. Further, indicating from which release pocket the motion device is to be dropped from based on a random number generating algorithm, induces trust into a user that the procedure is fully randomized.

The display board may further comprise at least one receiving pocket sensor for monitoring a presence of the motion device in each of the plurality of receiving pockets; a control device comprising a control unit configured to: provide a graphical representation on the display. The graphical representation may comprise at least one graphical element. The control unit may detect a presence of the motion device in a resolved receiving pocket of the plurality of receiving pockets based on sensor data obtained from one of the at least one receiving pocket sensors. The control unit may further update the graphical representation on the display based on the detected presence of the motion device so to emphasize the resolved receiving pocket.

A benefit of this is that the control unit may visually clarify for a user of when a motion device has landed in a receiving pocket. Also creating a more interactive experience for a user upon landing of a motion device in a receiving pocket by updating the graphical representation on the display based on the detected presence of the motion device in a receiving pocket.

The control unit of the control device may further be configured to: provide the graphical representation on the display, the graphical representation comprising a plurality of graphical elements, each graphical element being associated with a corresponding receiving pocket of the plurality of receiving pockets; update the graphical representation based on the detected presence of the motion device by emphasizing the graphical element associated with the resolved receiving pocket. It should be noted that there may be a plurality of graphical elements being associated with a corresponding receiving pocket.

A benefit of this is that the receiving pocket that the motion device lands into is emphasized such that a user recognizes the result of a procedure in the ROG system. Further, each graphical element being associated with a receiving pocket may correspond to a random number or a random symbol. In a gaming setting, this may correspond to a price. Thus, each graphical element may visualize a price that a user participating on a game can win if the motion device lands in the respective receiving pocket. Thus, the random output of the ROG system may correspond to the receiving pocket the motion device has landed into and which random output symbol/number that specific receiving pocket is associated to. Hence, each receiving pocket is associated to a graphical element prior to the motion device is dropped from the release pocket.

The control unit of the control device may further be configured to: update the graphical representation by visually expanding the graphical element associated with the resolved receiving pocket; and/or visually changing the other graphical elements of the plurality of graphical elements.

This further allows for users to conveniently determine which receiving pocket the motion device has landed into and which random output symbol/number this receiving pocket is associated with.

The visually changing may comprise emphasizing the graphical element of the receiving pocket that the motion device has landed into by blanking the remaining graphical elements.

The visually changing may further comprise increasing the brightness of said graphical element associated to the receiving pocket the motion device has landed into and/or decreasing the brightness of the remaining graphical elements.

The visually changing may further comprise; dynamically rearranging the position of the graphical element associated with the receiving pocket that the motion device has landed into.

DETAILED DESCRIPTION

In the following detailed description, some embodiments of the present disclosure will be described. However, it is to be understood that features of the different embodiments are exchangeable between the embodiments and may be combined in different ways, unless anything else is specifically indicated. Even though in the following description, numerous specific details are set forth to provide a more thorough understanding of the provided ROG system, it will be apparent to one skilled in the art that the ROG system may be realized without these details. In other instances, well known constructions or functions are not described in detail, so as not to obscure the present disclosure. The disclosure is not limited by the embodiments described above but can be modified in various ways within the scope of the claims.

Figure 1:
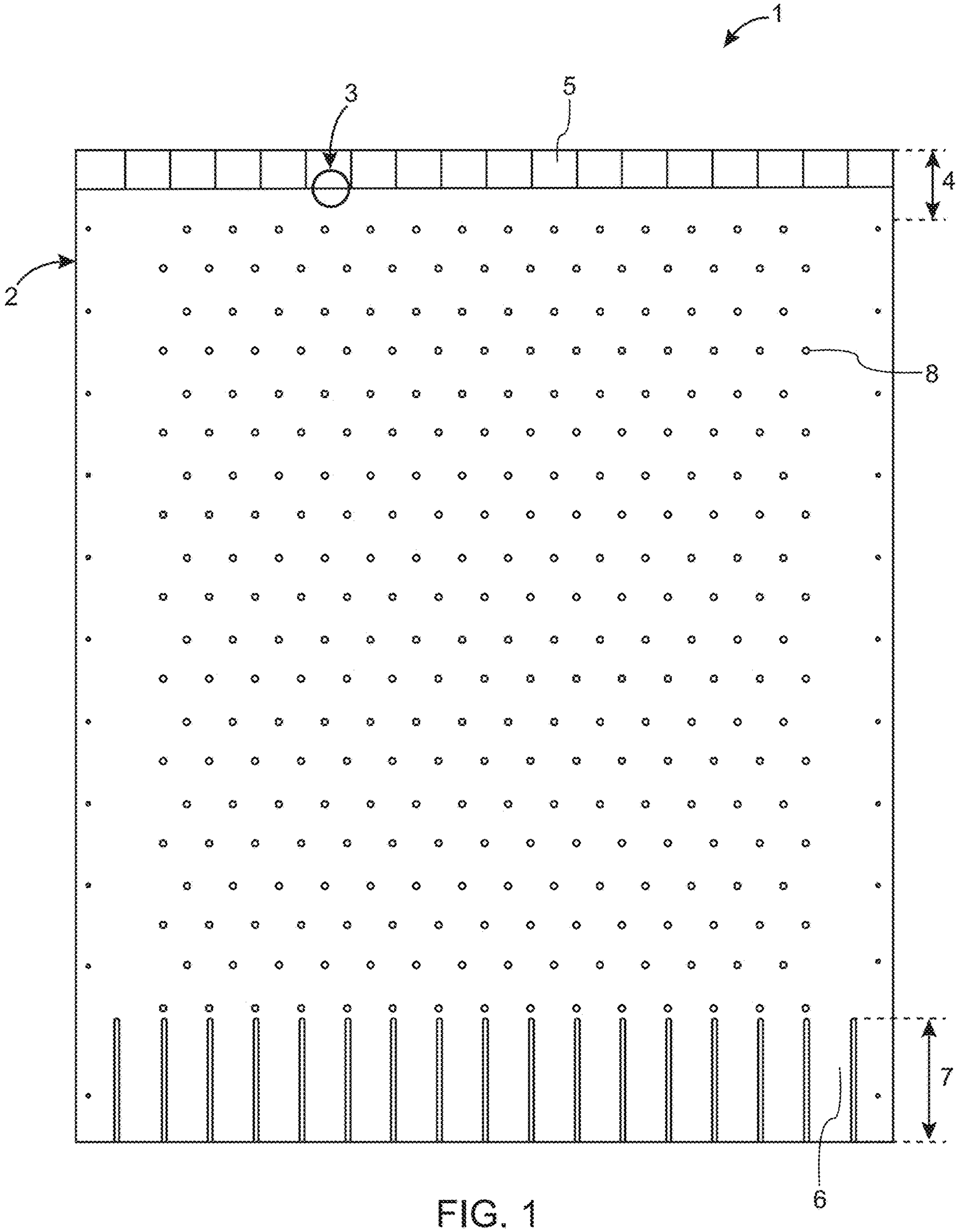
FIG. 1 depicts a front view of a ROG system where a motion device is partially in a release pocket.

FIG. 1 illustrates a random output generating, ROG system 1 comprising: a display board 2 and a motion device 3; wherein the display board 2 comprises: a top portion 4 having a plurality of release pockets 5 and a plurality of receiving pockets 6 forming a common row on an, opposite, bottom portion 7, and a plurality of obstacles 8 arranged in a pattern in-between said top portion 4 and said bottom portion 7.

The motion device 3 is arranged such that when released from one of said at least one release pockets 5, it is transferred at least partly by gravitational force to one of said receiving pockets 6 according to a random route via collisions with at least two of said plurality of obstacles 8. The motion device 3 is further arranged to complete the random route within a predetermined time period; wherein the motion device 3 comprises a motion sensor 9 for monitoring a movement of the motion device 3; control circuitry 10, and at least one illumination device 11. The control circuitry 10 is configured to control the at least one illumination device 11 based on at least one of the movement of the motion device 3 and a position of the motion device 3 relative to the display board 2. The motion sensor 9 may be an accelerometer, or the motion sensor 9 may be a gyroscope.

In FIG. 1, the motion device 3 is positioned partially in a release pocket 4. Thus, FIG. 1 shows the motion device 3 in a situation where it just has been released from the release pocket 4. As further seen in the FIGS. 1-6, the plurality of obstacles 8 are arranged to a large extent in a quincunx pattern which refers to a geometric pattern consisting of five points forming a cross. However, it should be understood that other geometric patterns may be used.

As further seen in the FIGS. 1-3 and 5-6, the display board 2 comprises an equal number of release pockets 5 and receiving pockets 6. Hence, the motion device 3 may be dropped from any of the release pockets 5 and have a random chance to land in any of the receiving pockets 6. The receiving pockets 6 and the release pockets 5 may have the same dimensions, i.e., the same height/width.

Figure 2:
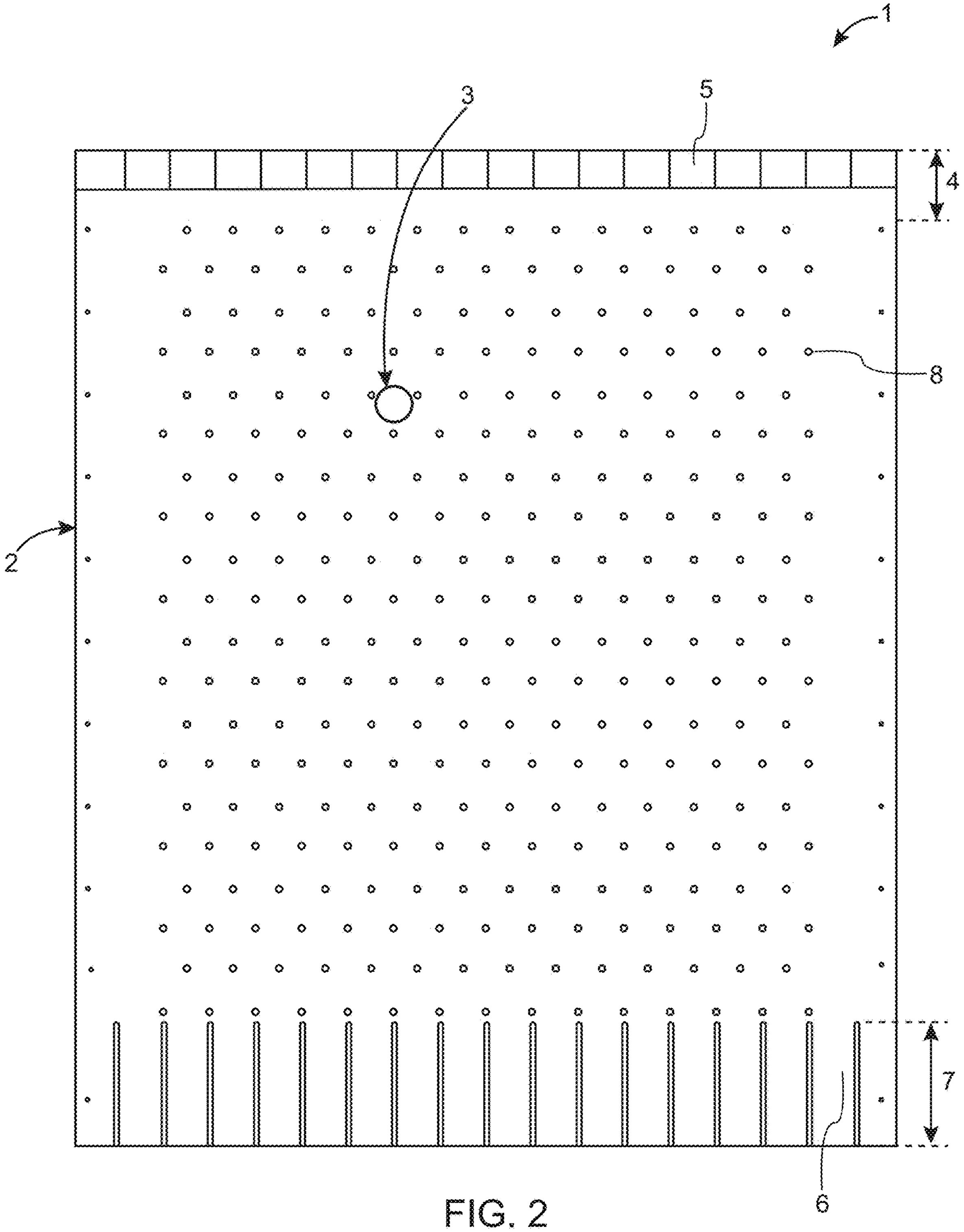
FIG. 2 depicts a front view of a ROG system where a motion device is colliding with obstacles.

The ROG system 1 may be implemented in a gaming/gambling setting such that a user may participate in the game FIG. 2 shows the ROG system 1 in FIG. 1, with the difference that the motion device 3 is closer to the receiving pocket 5 compared to FIG. 1, where the motion device 3 just has been released. As seen in FIG. 2, the motion device collides with one of the plurality of obstacles 8. The obstacles 8, allow the motion device 3 to travel according to a random route to the receiving pockets 6.

Figure 3:
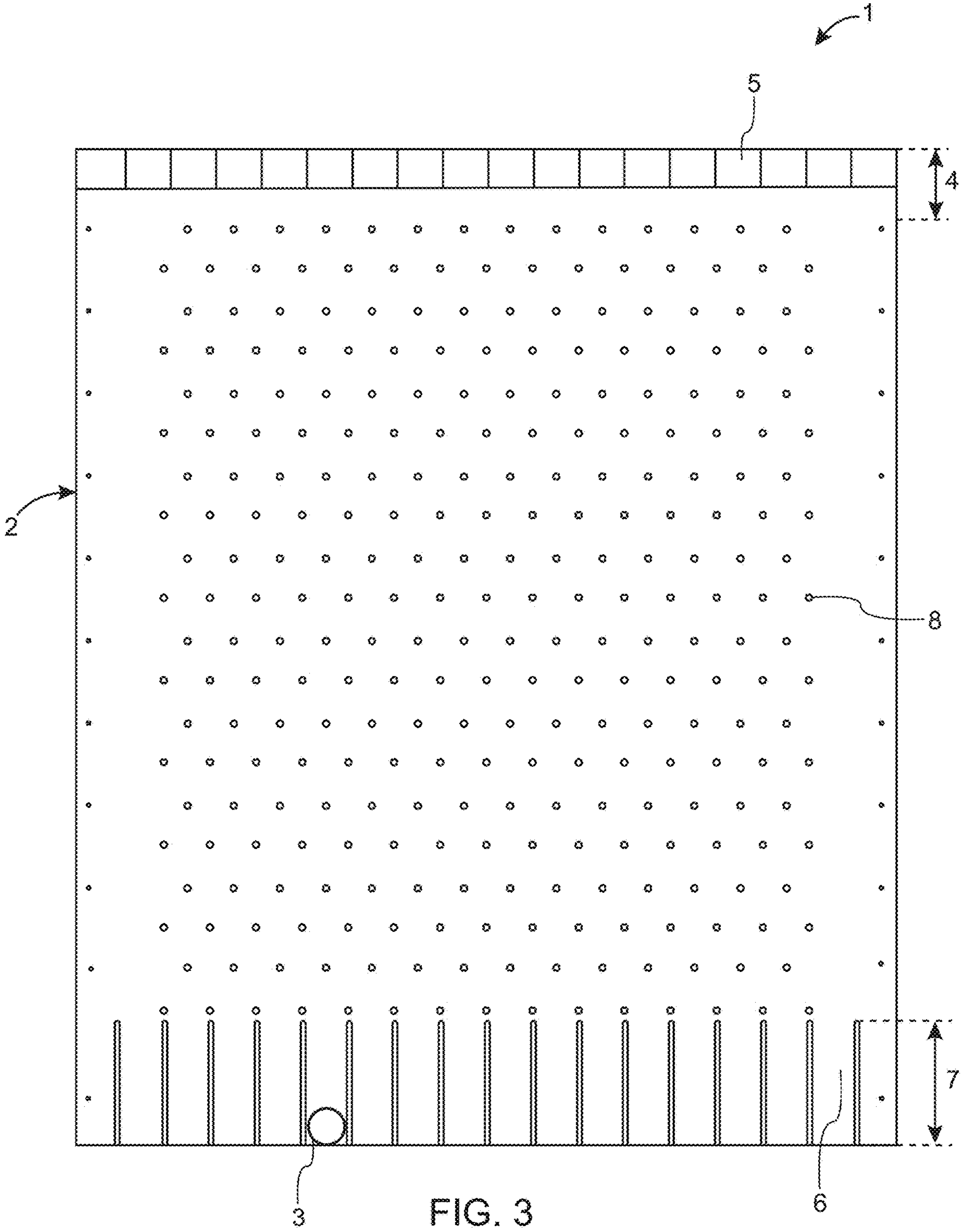
FIG. 3 depicts a front view of a ROG system where a motion device is in a receiving pocket.

FIG. 3 shows the ROG system 1 as in FIGS. 1 and 2, with the difference that the motion device 3 has landed in a receiving pocket 6. Hence, FIGS. 1-3 depicts sequences of a route that the motion device 3 can travel, starting by being dropped from a release pocket 5 to landing in a receiving pocket 6.

Figure 4:
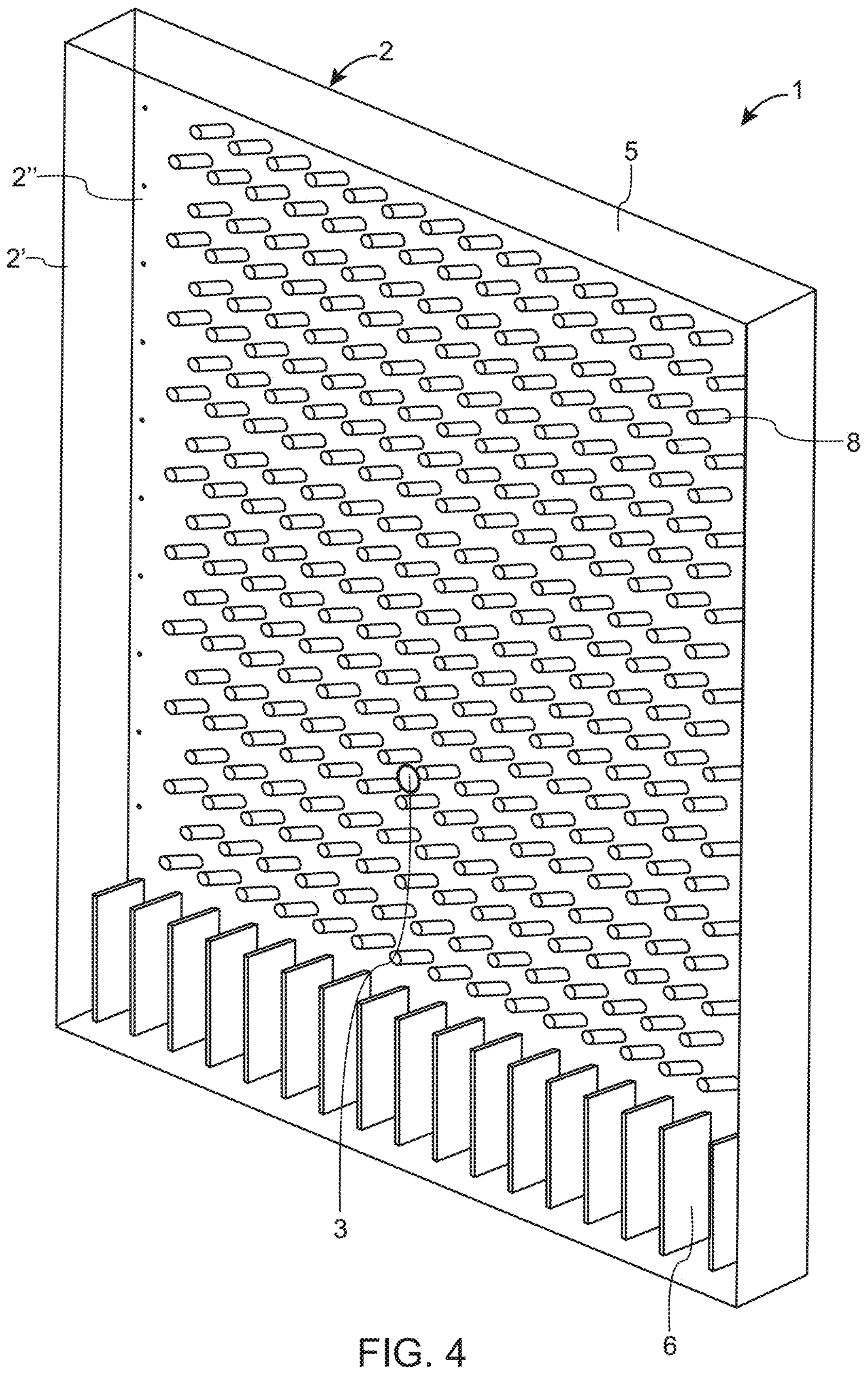
FIG. 4 depicts a perspective view of a ROG system.

FIG. 4 shows the ROG system 1 in a perspective view. As seen in FIG. 4, the obstacles 8 extend outwardly from the display board 2, perpendicular to the board 2. Further, the obstacles 8 are in the form of cylinders. However, the obstacles may have any other form, such as a polygonal form. The procedure for the motion device 3 dropping from a receiving pocket 5 as shown in FIG. 2, being transferred through the display board colliding with the obstacles 8 as shown in FIG. 3 to finally land in a receiving pocket 6 as shown in FIG. 4, is completed within a predetermined time period. The ROG system 1 in FIG. 4 comprises one release pocket 5. The time period is in the range of 5-15 seconds, preferably in the range of 9-11 seconds. FIG. 4 further shows that the display board 2 comprises a back surface 2'', and a front surface 2'. The front surface 2' is transparent such that the motion device 3 is visible along the random route in the video stream. The front surface 2' may be a suitable type of glass. As seen in FIG. 4, the obstacles extend intermediate the front surface 2' and the back surface 2". Extending from the back surface 2" towards the front surface 2'.

Figure 5:
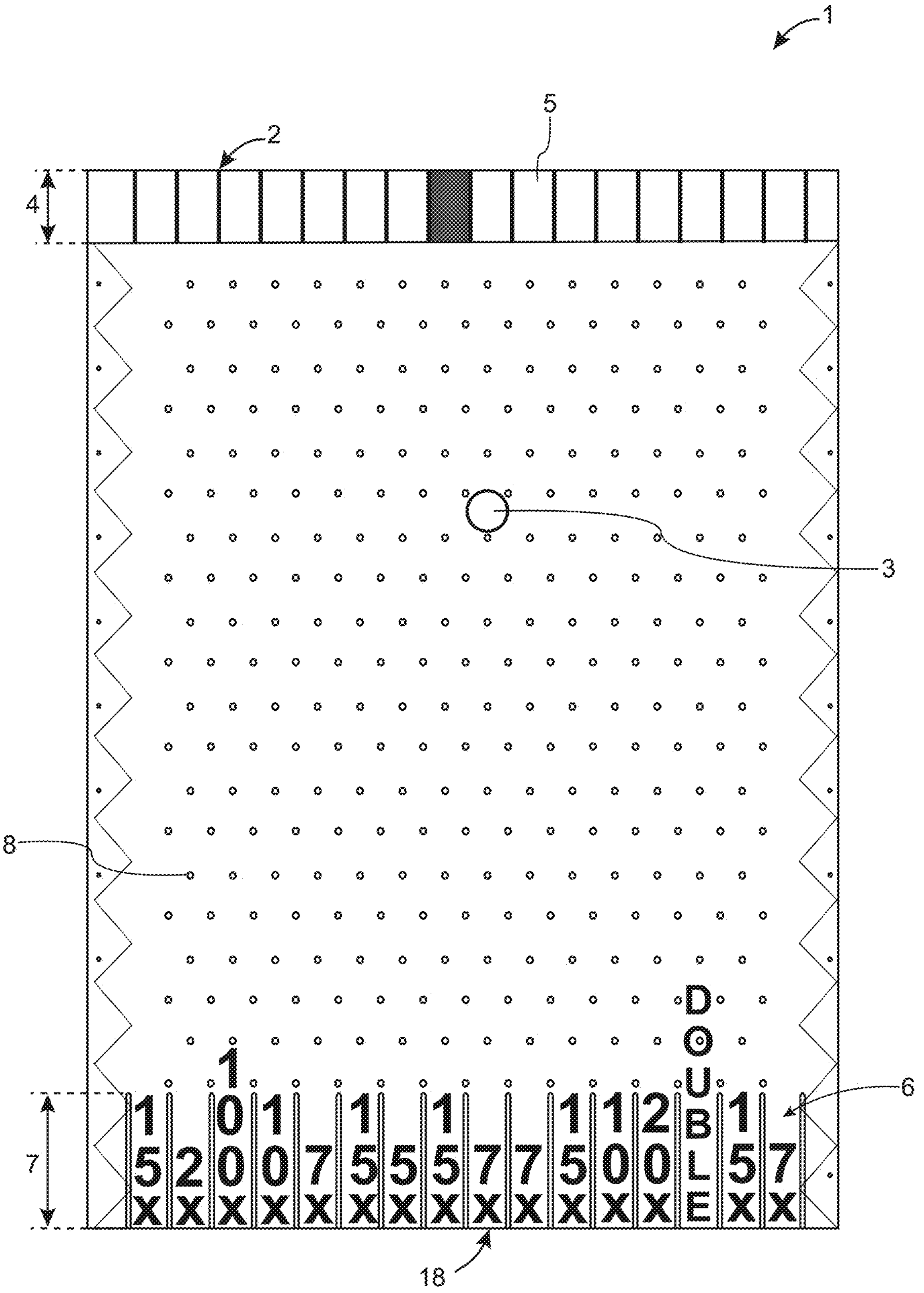
FIG. 5 depicts a front view of a ROG system with graphical elements where a motion device is colliding with obstacles.

FIG. 5 shows the ROG system 1 wherein the back surface 2" comprises a (electronic) display, and wherein the display board 2 provides a graphical representation on the display, the graphical representation comprising at least one graphical element 18. The graphical representation may be defined as all the graphical elements 18 on the display at a certain time period. Thus, the graphical representation may be all the graphical elements 18 visible in FIGS. 5 and 6. The graphical representation is seen in FIG. 5 to be provided in the receiving pockets of the display board. Thus, each graphical element 18 is associated with a corresponding receiving pocket 6 of the plurality of receiving pockets 6. The back surface 2" may be a part of the display, hence the back surface 2" and the display may be the same. Thus, the display may be integrated in the back surface 2" forming the same component. Accordingly, the ROG system 1 may comprise a (electronic) display/back surface 2". However, alternatively the display may only form part of the back surface.

Figure 6:
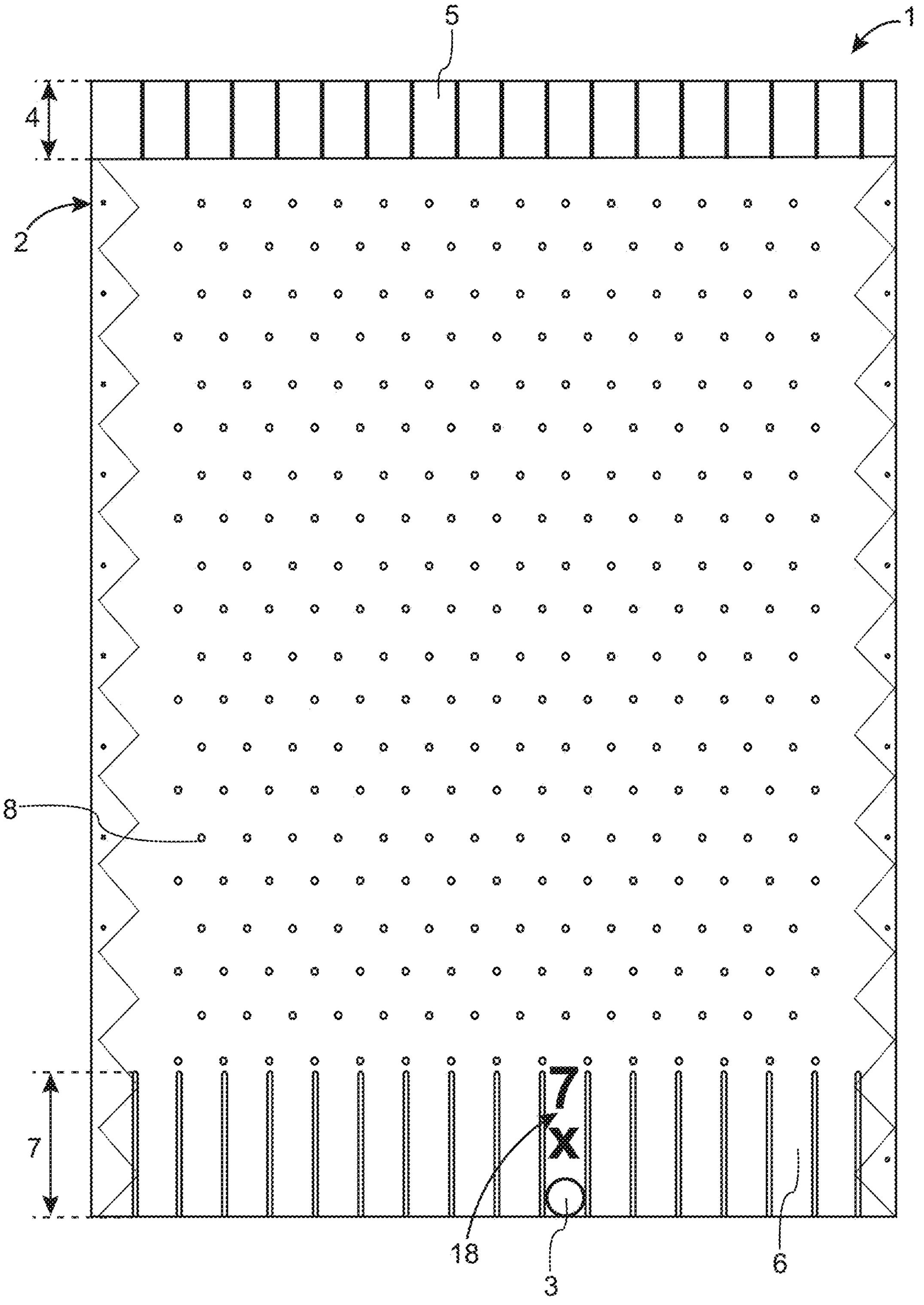
FIG. 6 depicts a front view of a ROG system with graphical elements where a motion device is in a receiving pocket.

FIG. 6 shows the ROG according to FIG. 5, with the difference that the motion device 3 has landed in a receiving pocket 6. As further seen in FIG. 6, there is only one graphical element 18 visible. Accordingly, the graphical representation has in FIG. 6 been updated based on the detected presence of the motion device 3 by emphasizing the graphical element 18 associated with the resolved receiving pocket 6.

Figure 7A:
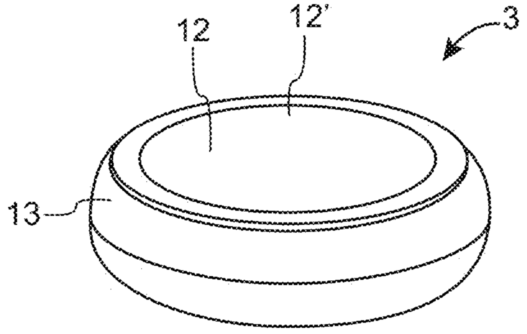
FIG. 7*a* depicts a motion device.

FIG. 7*a* shows the motion device 3 comprising a core portion 12 in the shape of a cylindrical disc; and an annular bumper 13 surrounding the circumference of said core portion 12; wherein the core portion 12 comprises a top surface 12' and a parallel bottom surface 12" extending beyond the height of the bumper 13. The top surface 12' and the parallel bottom surface 12" may be level with the height of the bumper 13.

Figure 7B:
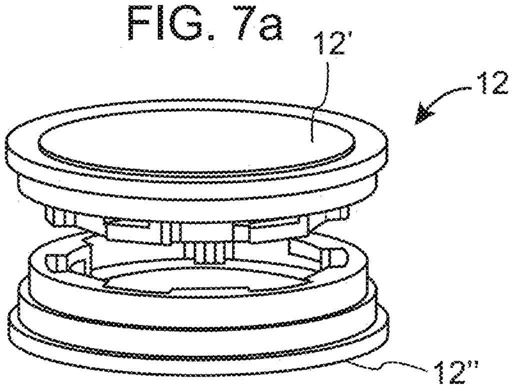
FIG. 7*b* depicts an exploded view of a core portion of a motion device.

FIG. 7*b* shows the core portion 12 of the motion device 3 in an exploded view. As seen in FIG. 7*b*, there is room within the core 12 of the motion device 3 to arrange different type of items such as electric circuitry, batteries, illuminating devices or any other suitable items. The annular bumper 13 is constructed to take damage in collisions so as to act as a shock absorber. The motion device 3 is constructed such that the top and/or the bottom surface 12', 12" glide down the surface of the display board 2. The illumination device 11 may illuminate from any portion of the motion device 3.

Figure 7C:
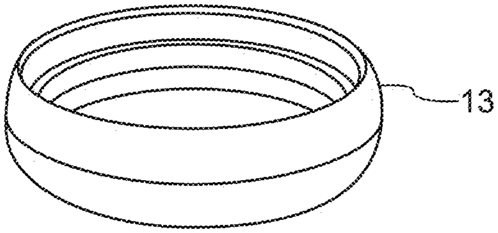
FIG. 7*c* depicts a bumper of a motion device.

FIG. 7*c* shows the annular bumper 13 of the motion device 3. The annular bumper 13 in FIG. 7*c* comprises a resilient material, and wherein the top surface 12' and the bottom surface 12" of the motion device 3 have a friction coefficient below a threshold value. Thus, the annular bumper 13 may be deformable.

The control circuitry 10 is configured to activate the at least one illumination device 11 such that the illumination device 11 is active while said motion device 3 is transferred at least partly by gravitational force towards one of said receiving pockets 6 subsequently to being released from one of the at least one release pockets 5 based on a signal indicative of the movement of the motion device 3 obtained from the motion sensor 9. Thus, in FIGS. 2 and 3, the illumination device 11 in the motion device 3 is active since it is transferred towards one of the receiving pockets 6. The term "active" in this setting, may refer to that the illumination device 11 emits a light that is visible to the user. The illumination device 11 may also emit a light in a flashing manner when active.

The control circuitry 10 is further configured to set the motion device 3 in a power conserving mode when the motion device 3 is stationary based on a signal indicative of the movement of the motion device 3 obtained from the motion sensor 9, wherein the power conserving mode comprises deactivating the illumination device 11. Accordingly, in FIG. 4, the illumination device 11 in the motion device 3 is not active since it is stationary in a receiving pocket 6.

Figure 8:
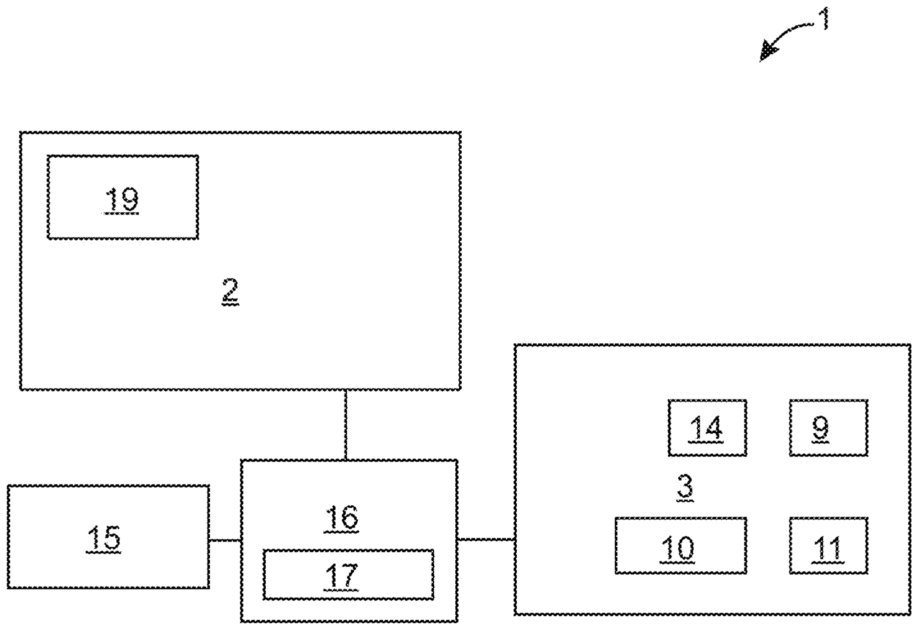
FIG. 8 schematically depicts a ROG system.

The motion device 3 may further comprise a position sensor 14 as seen in FIG. 8, wherein the control circuitry 10 is further configured to set said motion device 3 in a power conserving mode when said motion device 3 is at a predetermined distance from the display board 2 or when said motion device 3 is located in a receiving pocket 6 based on a signal indicative of a position of the motion device 3 relative to the display board 2 obtained from the position sensor 14, wherein the power conserving mode comprises deactivating the illumination device 11. The power conserving mode may further comprise deactivating the motion sensor 9.

FIG. 8 discloses a ROG system 1 comprising one camera device 15 arranged to monitor a front surface 2' of the display board 2 (display board not shown in FIG. 8) and to output data comprising a video stream of the display board 2. The display board 2 comprises the front surface 2' and a back surface 2", wherein the plurality of obstacles 8, the at least one release pocket 5, and the plurality of receiving pockets 6 are arranged between the front surface 2' and the back surface 2". The position sensor 14 may measure linear or angular position in reference to a fixed point or arbitrary reference. Thus, the position may include absolute position or relative position.

Further, as seen in FIG. 8, the ROG system 1 may comprise a control device 16 comprising a control unit 17 configured to provide a graphical representation on the display, the graphical representation comprising at least one graphical element 18 (see e.g., FIG. 5). The control unit 17 may further be configured to randomly select one of the plurality of release pockets 5 based on an output of a random number generating algorithm. Update the graphical representation of the display so to emphasize the randomly selected release pocket prior to the motion device being dropped from the randomly selected release pocket 5. This is shown in FIG. 5, where there is seen which release pocket 5 the motion device 3 has been dropped from, marked with a black shading.

The display board 2 may further comprise: at least one receiving pocket sensor 19 for monitoring a presence of the motion device 3 in each of the plurality of receiving pockets 6; a control device 16 comprising a control unit 17 configured to: provide a graphical representation on the display, the graphical representation comprising at least one graphical element 18; detect a presence of the motion device 3 in a resolved receiving pocket 6 of the plurality of receiving pockets 6 based on sensor data obtained from one of the at least one receiving pocket sensors 19; update the graphical representation on the display based on the detected presence of the motion device 3 so to emphasize the resolved receiving pocket 6.

FIG. 8 shows a control unit 17 of the control device 16 is further configured to: provide the graphical representation on the display, the graphical representation comprising a plurality of graphical elements 18, at least one graphical element 18 being associated with a corresponding receiving pocket 6 of the plurality of receiving pockets 6 (see e.g., FIG. 5). Each of the at least one graphical element 18 associated with a corresponding receiving pocket 6 may be randomly generated by a random number generator algorithm. Further, update the graphical representation based on the detected presence of the motion device 3 by emphasizing the graphical element 18 associated with the resolved receiving pocket 6 (see e.g., FIG. 6). The resolved receiving pocket 6 refers to the receiving pocket 6 that the motion device 3 has landed into.

The control circuitry 10 and the control unit 17 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other components, such as device readable medium functionality or storage medium. The control unit 16 and the motion device 3 may communicate wirelessly. Further, the control circuitry 10 and control unit 17 may execute instructions stored in device readable medium or in memory within processing circuitry to provide the functionality disclosed herein. Storage medium may be configured to include memory such as RAM, ROM, programmable read-only memory, erasable programmable read-only memory, electrically erasable programmable read-only memory, magnetic disks, optical disks, floppy disks, hard disks, removable cartridges, or flash drives. The control circuitry 10 may comprise a processing device arranged to run computer implemented instruction sets, stored a computer readable storage medium, for controlling the operation of the ROG system 1.

The control unit 16 of the control device 17 shown in FIG. 8 may further configured to update the graphical representation by: visually expanding the graphical element 18 associated with the resolved receiving pocket; and visually changing the other graphical elements 18 of the plurality of graphical elements 18.

The visually changing may comprise emphasizing the graphical element 18 of the receiving pocket 6 that the motion device 3 has landed into by blanking the remaining graphical elements 18, which is illustrated in FIG. 6, where only the graphical element 18 that the motion device 3 has landed in to is emphasized and the rest are blanked.

The visually changing may further comprise increasing the brightness of said graphical element 18 associated to the receiving pocket 6 the motion device 3 has landed into and/or decreasing the brightness of the remaining graphical elements 18.

The visually changing may further comprise; dynamically rearranging the position of the graphical element 18 associated with the receiving pocket 6 that the motion device 3 has landed into. The term "dynamically rearranging" refers to that the graphical element 18 moves around the display so to alert a user which receiving pocket 6 the motion device 3 has landed into.

The ROG system 1 may be implemented in a gaming/gambling setting. It may be implemented such that a user may participate in the game and graphical element 18 being associated with a corresponding receiving pocket 6 displays a price/bonus payoff that the user receives if the motion device 3 lands in that specific receiving pocket 6. Further, the video stream recorded by the camera device 15 may be shared, over a network, to users that can view the stream from a respective user equipment. A user equipment may be a tablet, computer or cell-phone. Thus, users may participate in the ROG system 1 over a network and win prices depending on which receiving pocket 6 the motion device 3 lands into and which graphical element 18 that is associated with the corresponding receiving pocket 6.

The ROG system 1 as disclosed herein may comprise power circuitry. Power circuitry may comprise, or be coupled to, power management circuitry and is configured to perform the functionality described herein. Power circuitry may receive power from power source. Power source may either be included in, or external to, power circuitry. Further, power source may comprise a source of power in the form of a battery or battery pack which is connected to, or integrated in, power circuitry. The battery may provide backup power should the external power source fail. Other types of power sources, such as photovoltaic devices or super capacitors may also be used.

The invention claimed is:

1. A random output generating system comprising:

a motion device; and a display board comprising:

a top portion having at least one release pocket;

a plurality of receiving pockets forming a common row on an, opposite, bottom portion; and a plurality of obstacles arranged in a pattern between the top portion and the bottom portion;

wherein the motion device is arranged such that when released from one of the at least one release pockets, it is transferred at least partly by gravitational force to one of the plurality of receiving pockets according to a random route via collisions with at least two of the plurality of obstacles;

wherein the motion device comprises control circuitry, a motion sensor for monitoring a movement of the motion device, and at least one illumination device, the control circuitry configured to control the at least one illumination device based on at least one of the movement of the motion device or a position of the motion device relative to the display board; and wherein the control circuitry is further configured to activate the at least one illumination device such that the at least one illumination device is active while the motion device is transferred at least partly by gravitational force towards one of the plurality of receiving pockets subsequent to being released from one of the at least one release pockets based on a signal indicative of the movement of the motion device obtained from the motion sensor.

2. The system of claim 1, wherein the motion device comprises:

a core portion in the shape of a cylindrical disc; and an annular bumper surrounding a circumference of the core portion;

wherein the core portion comprises a top surface and a parallel bottom surface extending beyond a height of the annular bumper.

3. The system of claim 2, wherein the annular bumper comprises a resilient material, and wherein the top surface and the bottom surface of the core portion of the motion device have a friction coefficient in relation to the display board below a predetermined threshold value.

4. The system of claim 1, wherein:

the motion device further comprises a position sensor;

the control circuitry is further configured to set the motion device in a power conserving mode when the motion device is at a predetermined distance from the display board or when the motion device is located in one of the plurality of receiving pockets based on a signal indicative of the position of the motion device relative to the display board obtained from the position sensor; and the power conserving mode comprises deactivating the at least one illumination device.

5. The system of claim 4, wherein the power conserving mode further comprises deactivating the motion sensor.

6. The system of claim 1, wherein the pattern comprises a quincunx pattern.

7. The system of claim 1, wherein the predetermined time period ranges from 5 seconds to 15 seconds.

8. The system of claim 1, wherein the at least one release pocket comprises a plurality of release pockets, and wherein a number of the plurality of release pockets is equal to a number of the plurality of receiving pockets.

9. The system of claim 1, wherein the control circuitry is further configured to set the motion device in a power conserving mode when the motion device is stationary based on a signal indicative of the movement of the motion device obtained from the motion sensor, and wherein the power conserving mode comprises deactivating the at least one illumination device.

10. The system of claim 1, further comprising at least one camera arranged to monitor a front surface of the display board and to output data comprising a video stream of the display board, wherein:

the display board comprises the front surface and a back surface comprising a display;

the plurality of obstacles, the at least one release pocket, and the plurality of receiving pockets are arranged between the front surface and the back surface of the display board;

the front surface is transparent such that the motion device is visible along the random route in the video stream;

the at least one release pocked comprises a plurality of release pockets; and the display board further comprises a control device comprising a control unit, the control unit comprising circuitry configured to:

provide a graphical representation on the display, the graphical representation comprising at least one graphical element;

randomly select one of the plurality of release pockets based on an output of a random number generating algorithm; and update the graphical representation on the display to emphasize the randomly selected one of the plurality of release pockets prior to the motion device being dropped from the randomly selected one of the plurality of release pockets.

11. A random output generating system comprising:

a motion device; and a display board comprising:

a top portion having at least one release pocket;

a plurality of receiving pockets forming a common row on an, opposite, bottom portion; and a plurality of obstacles arranged in a pattern between the top portion and the bottom portion;

wherein the motion device is arranged such that when released from one of the at least one release pockets, it is transferred at least partly by gravitational force to one of the plurality of receiving pockets according to a random route via collisions with at least two of the plurality of obstacles;

wherein the motion device comprises a motion sensor for monitoring a movement of the motion device, control circuitry, and at least one illumination device, wherein the control circuitry is configured to control the at least one illumination device based on at least one of the movement of the motion device or a position of the motion device relative to the display board; and wherein the control circuitry is further configured to set the motion device in a power conserving mode when the motion device is stationary based on a signal indicative of the movement of the motion device obtained from the motion sensor, wherein the power conserving mode comprises deactivating the at least one illumination device.

12. The system of claim 11, wherein the control circuitry is configured to activate the at least one illumination device such that the at least one illumination device is active while the motion device is transferred at least partly by gravitational force to one of the plurality of receiving pockets subsequent to being released from one of the at least one release pockets based on a signal indicative of the movement of the motion device obtained from the motion sensor.

13. The system of claim 11, further comprising at least one camera arranged to monitor a front surface of the display board and to output data comprising a video stream of the display board, wherein:

the display board comprises the front surface and a back surface;

the plurality of obstacles, the at least one release pocket, and the plurality of receiving pockets are arranged between the front surface and the back surface; and the front surface is transparent such that the motion device is visible along the random route in the video stream.

14. The system of claim 13, wherein:

the at least one release pocket comprises a plurality of release pockets;

the back surface of the display board comprises a display; and the display board further comprises a control device comprising a control unit, the control unit comprising circuitry configured to:

provide a graphical representation on the display, the graphical representation comprising at least one graphical element;

randomly select one of the plurality of release pockets based on an output of a random number generating algorithm; and update the graphical representation on the display to emphasize the randomly selected one of the plurality of release pockets prior to the motion device being dropped from the randomly selected one of the plurality of release pockets.

15. A random output generating system comprising:

a motion device;

a display board comprising:

a top portion having a plurality of release pockets;

a plurality of receiving pockets forming a common row on an, opposite, bottom portion;

a plurality of obstacles arranged in a pattern between the top portion and the bottom portion;

a front surface;

a back surface comprising a display; and a control device comprising a control unit; and at least one camera device arranged to monitor the front surface of the display board and to output data comprising a video stream of the display board;

wherein the control unit comprises circuitry configured to:

provide a graphical representation on the display, the graphical representation comprising at least one graphical element;

select one of the plurality of release pockets; and update the graphical representation on the display to emphasize the randomly selected one of the plurality of release pockets prior to the motion device being dropped from the randomly selected one of the plurality of release pockets;

wherein the motion device is arranged such that when released from one of the plurality of release pockets, it is transferred at least partly by gravitational force to one of the plurality of receiving pockets according to a random route via collisions with at least two of the plurality of obstacles;

wherein the plurality of obstacles, the plurality of release pockets, and the plurality of receiving pockets are arranged between the front surface and the back surface of the display board, and the front surface of the display board is transparent such that the motion device is visible along the random route in the video stream; and wherein the motion device comprises control circuitry, a motion sensor for monitoring a movement of the motion device, and at least one illumination device, the control circuitry configured to control the at least one illumination device based on at least one of the movement of the motion device or a position of the motion device relative to the display board.

16. The system of claim 15, wherein the control circuitry is further configured to activate the at least one illumination device such that the at least one illumination device is active while the motion device is transferred at least partly by gravitational force to one of the plurality of receiving pockets subsequent to being released from one of the plurality of release pockets based on a signal indicative of the movement of the motion device obtained from the motion sensor.

17. The system of claim 15, wherein the control circuitry is further configured to set the motion device in a power conserving mode when the motion device is stationary based on a signal indicative of the movement of the motion device obtained from the motion sensor, and wherein the power conserving mode comprises deactivating the at least one illumination device.

18. The system of claim 15, wherein:

the display board further comprises at least one receiving pocket sensor for monitoring a presence of the motion device in the plurality of receiving pockets; and the circuitry of the control unit is further configured to:

detect the presence of the motion device in a resolved receiving pocket of the plurality of receiving pockets based on sensor data obtained from the at least one receiving pocket sensor; and update the graphical representation on the display to emphasize the resolved receiving pocket.

19. The system of claim 18, wherein the at least one graphical element comprises a plurality of graphical elements, and wherein each of the plurality of graphical elements represents one of the plurality of receiving pockets.

20. The system of claim 19, wherein the circuitry of the control unit is further configured to update the graphical representation by visually expanding a graphical element of the plurality of graphical elements that is associated with the resolved receiving pocket.

* * * * *